United States Patent
Soliman et al.

(10) Patent No.: US 7,107,135 B2
(45) Date of Patent: *Sep. 12, 2006

(54) AUXILIARY GEARSET SHIFT PROGRESSION COMMAND GENERATOR FOR A SWAP-SHIFT AUTOMATIC TRANSMISSION

(75) Inventors: Ihab Soliman, Dearborn, MI (US); Brian Keyse, Farmington Hills, MI (US); Ken Sovel, Lake Havasu City, AZ (US); Charles Suter, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/698,102

(22) Filed: Oct. 31, 2003

(65) Prior Publication Data
US 2005/0096823 A1    May 5, 2005

(51) Int. Cl.
G06F 7/00 (2006.01)
G06F 17/00 (2006.01)

(52) U.S. Cl. .................... 701/55; 701/51; 701/60; 701/66; 701/67; 477/34; 477/35; 477/68

(58) Field of Classification Search .................. 701/51, 701/52, 53, 54, 55; 477/34, 35, 68; 475/127, 475/128, 903
See application file for complete search history.

(56) References Cited

U.S. PATENT DOCUMENTS

| | | |
|---|---|---|
| 4,611,285 A | 9/1986 | Weisman, II |
| 5,157,608 A | 10/1992 | Sankpal et al. |
| 5,553,694 A | 9/1996 | Schulz et al. |
| 5,586,029 A | 12/1996 | Schulz et al. |
| 5,612,874 A | 3/1997 | Schulz et al. |
| 5,642,283 A | 6/1997 | Schulz et al. |
| 5,646,842 A | 7/1997 | Schulz et al. |
| 5,722,519 A | 3/1998 | Kirchhoffer |
| 5,758,302 A | 5/1998 | Schulz et al. |
| 5,809,442 A | 9/1998 | Schulz et al. |
| 5,835,875 A | 11/1998 | Kirchhoffer |
| 6,101,440 A | 8/2000 | Wagner et al. |
| 6,122,583 A | 9/2000 | Kirchhoffer et al. |
| 6,253,140 B1 | 6/2001 | Jain et al. |
| 6,278,926 B1 | 8/2001 | Jain et al. |
| 6,292,731 B1 | 9/2001 | Kirchhoffer et al. |
| 6,299,565 B1 | 10/2001 | Jain et al. |
| 6,301,538 B1 | 10/2001 | Kirchhoffer |
| 6,370,463 B1 | 4/2002 | Fujii et al. |
| 6,385,520 B1 | 5/2002 | Jain et al. |
| 6,577,939 B1 | 6/2003 | Keyse et al. |
| 6,780,131 B1 | 8/2004 | Itou et al. |
| 2002/0086761 A1 | 7/2002 | Hayabuchi et al. |
| 2004/0043857 A1 | 3/2004 | Nishida et al. |
| 2005/0096820 A1* | 5/2005 | Soliman et al. ............... 701/51 |

* cited by examiner

Primary Examiner—Gertrude A. Jeanglaude
(74) Attorney, Agent, or Firm—David B. Kelley; Brooks Kushman

(57) ABSTRACT

A target command generator for use in a control system for an automatic transmission having a simple planetary gearset in series with a multiple-ratio gearset, the target command generator providing input for a controller for the simple planetary gearset to achieve synchronized control of pressure operated friction elements of the gearsets to effect smooth swap-shifts during an overall transmission ratio change.

16 Claims, 10 Drawing Sheets

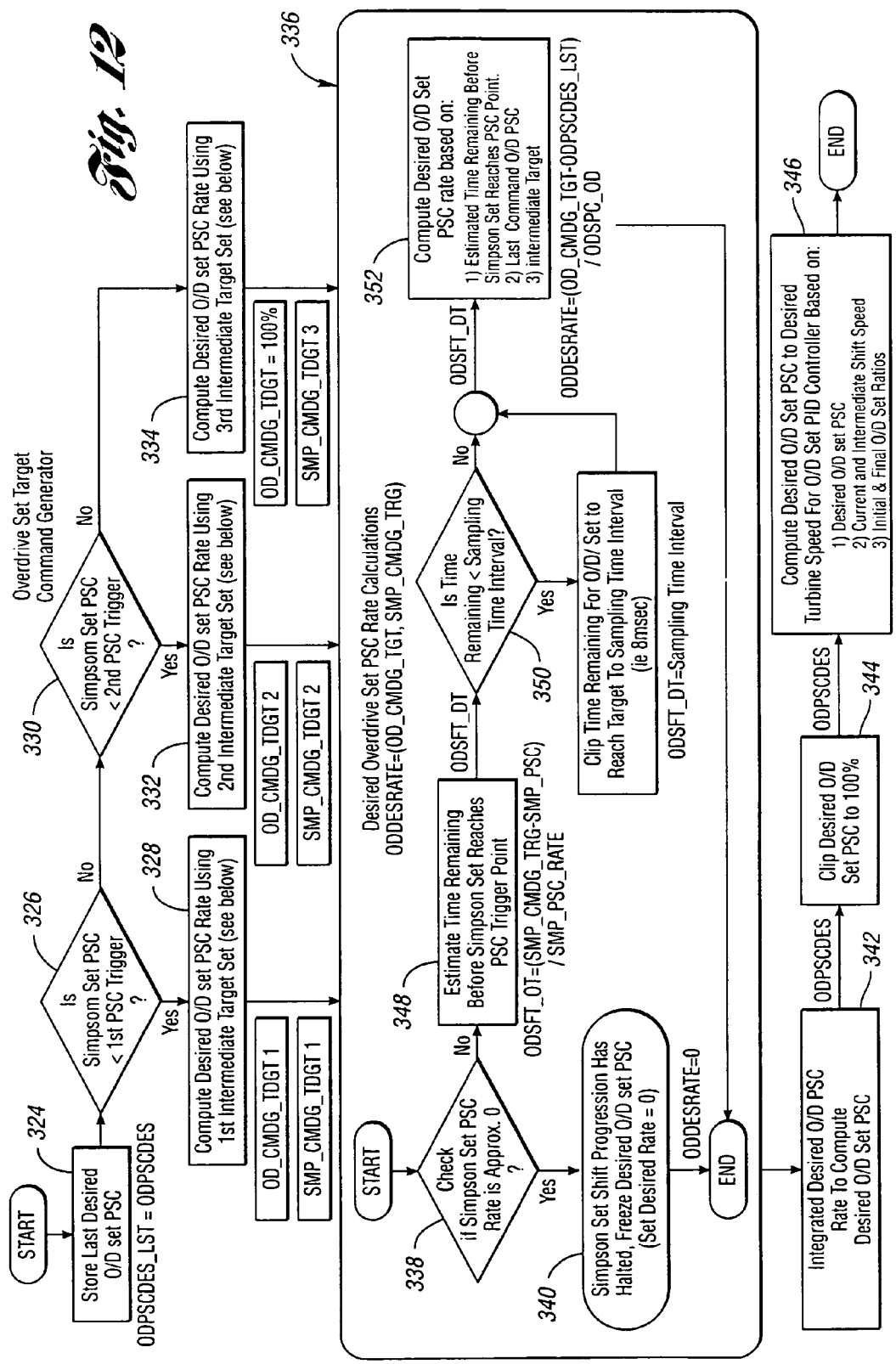

AUXILIARY GEARSET SHIFT PROGRESSION COMMAND GENERATOR FOR A SWAP-SHIFT AUTOMATIC TRANSMISSION

CROSS-REFERENCE TO RELATED APPLICATIONS

This application discloses a transmission control system that is related to the transmission control system of patent application, Ser. No. 10/699,383, now U.S. Pat. No. 6,961,646 entitled "Automatic Transmission Control System With Direct Electronic Swap-Shift Control," filed by Ihab S. Soliman, Brian Keyse and Brad Riedle on Oct. 31, 2003, which is assigned to the assignee of the present invention.

BACKGROUND OF THE INVENTION

1. Field of the Invention

The present invention relates to a multiple-ratio automatic transmission characterized by a swap-shift between at least two transmission ratios.

2. Background Art

Prior art U.S. Pat. Nos. 6,292,731; 5,722,519; 5,553,694; 5,758,302; 6,370,463; and 6,577,939 disclose control systems for the multiple-ratio automatic transmission for an automotive vehicle driveline which establish torque flow paths between the vehicle engine and vehicle traction wheels. The transmission of each of the prior art references uses an overdrive or auxiliary gearset in series relationship with respect to a multiple-ratio geared transmission, sometimes referred to as a main gearset or a Simpson gearset. The transmission is characterized by the so-called swap-shift during upshifts from a second gear ratio to a third gear ratio and from a second gear ratio to a fifth gear ratio as the vehicle is accelerated. Conversely, a swap-shift occurs during downshifts from the third gear ratio to the second gear ratio and from the fifth gear ratio to the second gear ratio.

During a swap-upshift from the second gear ratio to the third gear ratio, the overdrive gearset must be downshifted, while the Simpson gearset is upshifted, the shifts being synchronized or coordinated during shift progression in each gearset. Conversely, a swap-downshift from the third ratio to the second ratio requires a simultaneous upshift of the overdrive gearset and a downshift of the Simpson gearset in a synchronized manner.

Ratio changes in the overdrive gearset are controlled by pressure operated clutches and brakes, as are the ratio changes in the Simpson gearset. In the case of a swap-upshift from the second overall ratio to the third overall ratio, a reaction brake for the overdrive gearset must be released as a reaction brake for the Simpson gearset is applied. Conversely, on a 3-2 swap-downshift, a reaction brake for the Simpson gearset must be released in synchronism with the application of a friction brake for the overdrive gearset.

In the case of a swap-upshift from the second ratio to the fifth ratio, the reaction brake for the overdrive gearset must be released in synchronism with the engagement of a clutch for the Simpson gearset, the latter drivably connecting two gear elements of the Simpson gearset so that the Simpson gearset ratio, following an upshift, is unity.

Transmissions of the kind disclosed in prior art references, under certain operating conditions, cannot achieve precise synchronization of the upshift and the downshift of the two series-related gearsets during a swap-shift. Precise synchronization is required, however, throughout the life of the transmission, notwithstanding vehicle component and environmental variations. Although precise synchronization can initially be achieved by calibration, calibrated synchronism becomes less precise throughout the useful life of the transmission as the transmission ages. This may cause small errors in the upshift and downshift timing of the two gear units. Such errors in synchronism have a significant effect on the overall shift quality. Specifically, gear ratio "flares" and gear ratio "overshoots," as well as output torque disturbances, can result if synchronization errors develop.

SUMMARY OF THE INVENTION

A control system for a swap-shift transmission that includes the present invention achieves precise synchronization throughout the life of the transmission using an improved coordinated closed-loop control, which establishes precise upshift and downshift synchronization of the overdrive gear unit and the Simpson gear unit. One of the key elements of the coordinated closed-loop control is an overdrive set target command generator, which is responsible for determining the desired controller command for the overdrive gearset friction element so that precise shift synchronization can be maintained.

Unlike the control systems for known swap-shift transmissions, the ratio change control of the present invention does not use two independent ratio feedback control systems for controlling upshifts and downshifts of the separate overdrive and Simpson gearsets. In contrast, the present invention compensates for known two-way dynamic interaction between the overdrive gearset and the Simpson gearset during a ratio change. Further, unlike the control systems for the swap-shift transmissions disclosed in prior art references, there is sufficient real-time correction during closed-loop control of both friction elements for a desired command for the overdrive gearset friction element to compensate for variations in the Simpson gearset shift progression.

Some prior art designs, in contrast to the present invention, may use a scalar gain for the Simpson gearset ratio change progression in the calculation of a desired overdrive gearset percentage shift complete term. That is, a constant gain factor applied to a Simpson gearset actual percentage shift complete term is used to calculate a desired overdrive set percentage shift complete term. Other design approaches known in the prior art apply a one-dimensional table look-up in a controller memory to find a desired overdrive gearset percentage shift complete based on Simpson gearset ratio change progression.

A technique that employs a simple gain approach has shortcomings since it would be impossible to have an overdrive gearset start its ratio change late relative to the start of the Simpson gearset ratio change progression and at the same time end early before the Simpson gearset shift progression is completed. Unlike such prior art designs, the design of the present invention provides calibration flexibility in achieving desired percentage shift complete profiles for both the overdrive gearset and the Simpson gearset.

The design of the present invention also differs from prior art designs that use a look-up table based on the Simpson gearset percentage shift complete term since such an approach basically assumes that there will be a constant Simpson gearset ratio rate of change throughout the life of the transmission. But since a look-up table approach is adequate only if the Simpson gearset shifts in a linear manner. If there is any change in the Simpson gearset ratio change rate (i.e., there is a non-linearity), the percentage shift complete term would lead to synchronization errors with respect to the desired overdrive gearset percentage shift complete. The technique of the present invention compensates in real-time for changes in the ratio rate of change for the Simpson gearset, while achieving the desired overdrive percentage shift complete profile.

BRIEF DESCRIPTION OF THE DRAWINGS

FIG. 12 is a flow chart of the algorithm used in determining the percentage shift complete for the overdrive gearset and the Simpson gearset using the control technique of the present invention.

DETAILED DESCRIPTION OF AN EMBODIMENT OF THE INVENTION

The present invention has features that are disclosed in the related co-pending patent application previously identified. That application is incorporated herein by reference.

Figure 1A:
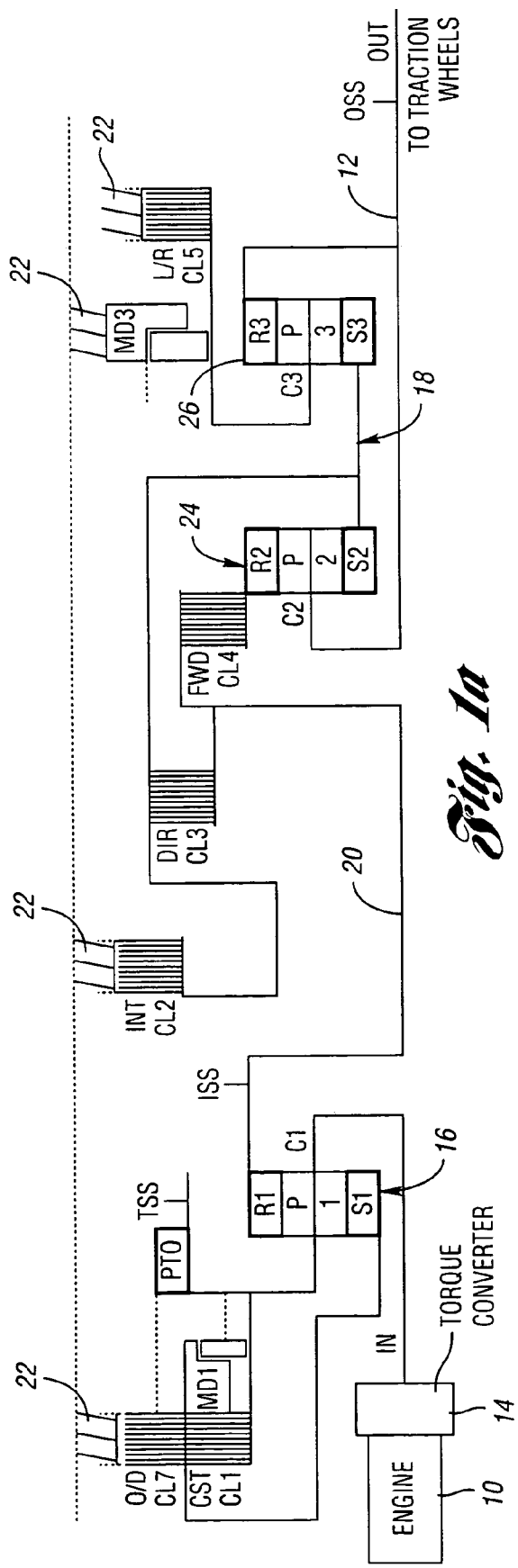
FIG. 1a is a stick diagram of a swap-shift transmission having an auxiliary gearset and a Simpson gearset.

In FIG. 1a, the engine for the powertrain is shown at 10 and the torque output shaft is shown at 12, the latter being connected to the traction wheels through a differential and axle assembly in the usual manner. Engine torque is delivered to and multiplied by a hydrokinetic torque converter 14, the torque converter turbine being connected to carrier C1 of a simple planetary overdrive gearset 16. A turbine speed sensor TSS measures turbine speed, which is the same as speed of carrier C1.

A compound Simpson planetary gearset is shown at 18. An intermediate shaft 20 connects the output ring gear R1 of the overdrive gearset 16 to the torque input side of forward clutch CL4 for the Simpson gearset 18. Intermediate shaft speed sensor ISS measures speed of the intermediate shaft 20 and ring gear R1.

The sun gear S1 for the overdrive gearset 16 can be braked to the transmission housing 22 by overdrive brake or clutch CL7. A coast clutch CL1 selectively connects sun gear S1 to the planetary carrier C1 of the overdrive gearset 16 when torque distribution through the transmission is reversed, such as in coast braking.

The sun gear S1 acts as a reaction point when the overdrive gearset 16 is in an overdrive mode. With the brake CL7 released, overrunning coupling MD1 drivably connects a planetary carrier C1 to the sun gear S1, which establishes a gear ratio of unity in the planetary gear unit 16.

The Simpson gearset 18 comprises a common sun gear, shown in FIG. 1a as S2 and S3. In some embodiments, the sun gears would be connected by a sun gear shaft as shown. Simpson gearset 18 comprises also second planetary gear unit 24 and third planetary gear unit 26. Torque output shaft 12 is connected to carrier C2 for the planetary gear unit 24. Ring gear R2 is connected to the intermediate shaft 20 through the forward clutch CL4 during forward drive operation.

When the Simpson gearset is in its lowest gear ratio, torque is distributed to the sun gear S3 of the third planetary gear unit, which drives the ring gear R3 in a forward driving direction as the carrier C3 is braked by the low and reverse brake CL5. Alternatively, the carrier C3 can be braked by the overrunning coupling MD3 to provide torque reaction for the carrier C3 during operation in the low gear ratio. Torque delivered to ring gear R2 through intermediate shaft 20 and forward clutch CL4 causes carrier torque from carrier C2 to be delivered to output shaft 12 to augment torque delivered to output shaft 12 from ring gear R3.

To upshift the transmission from the lowest gear ratio to the next highest gear ratio, the clutch CL2 is applied, thereby braking sun gear S2 of the second planetary gear unit 24. Carrier C2 and torque output shaft 12 then are driven at an increased speed relative to the speed of the carrier C1.

To upshift the transmission from the second ratio to the third ratio, the Simpson gearset ratio is upshifted, but the overdrive gearset ratio is downshifted by releasing brake CL7 so that the overrunning coupling MD1 will lock together the carrier C1 and the sun gear S1.

A shift of the transmission from the third ratio to the fourth ratio is achieved by upshifting the overdrive gearset 16. This is done by applying brake CL7, which anchors sun gear S1. This overdrives ring gear R1, and overrunning coupling MD1 begins to overrun.

A shift of the transmission from the fourth ratio to the fifth ratio is achieved by engaging direct clutch CL3 and releasing clutch CL2, which, together with forward clutch CL4, locks together sun gear S2 and ring gear R2 so that overrunning coupling MD3 overruns and the ratio in the Simpson gearset is unity.

A shift of the transmission from the fifth ratio to the sixth ratio can be achieved by merely braking the sun gear S1, as in the case of operation of the second and fourth ratios, to overdrive the gearset 16 as the ratio of the Simpson gearset remains at unity.

The output shaft speed sensor OSS in FIG. 1a measures the speed of ring gear R1 and output shaft 12. This speed sensor complements the other two speed sensors, SS1 and SS2, to provide speed information to the control system, which is speed-based.

Figure 1B:
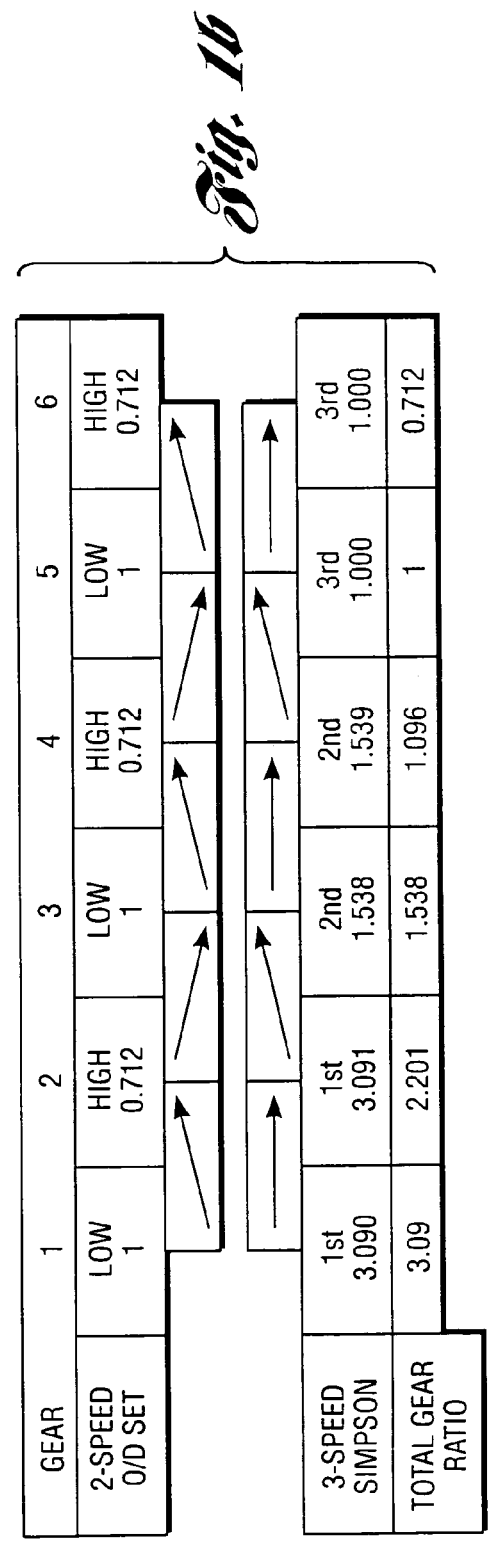
FIG. 1b is a chart showing the ratios of the overdrive gearset and the Simpson gearset for each of the overall gear ratios.

The arrows in the diagram of FIG. 1b indicate the ratio change direction for the gearsets 16 and 18 during ratio change progressions.

Figure 2:
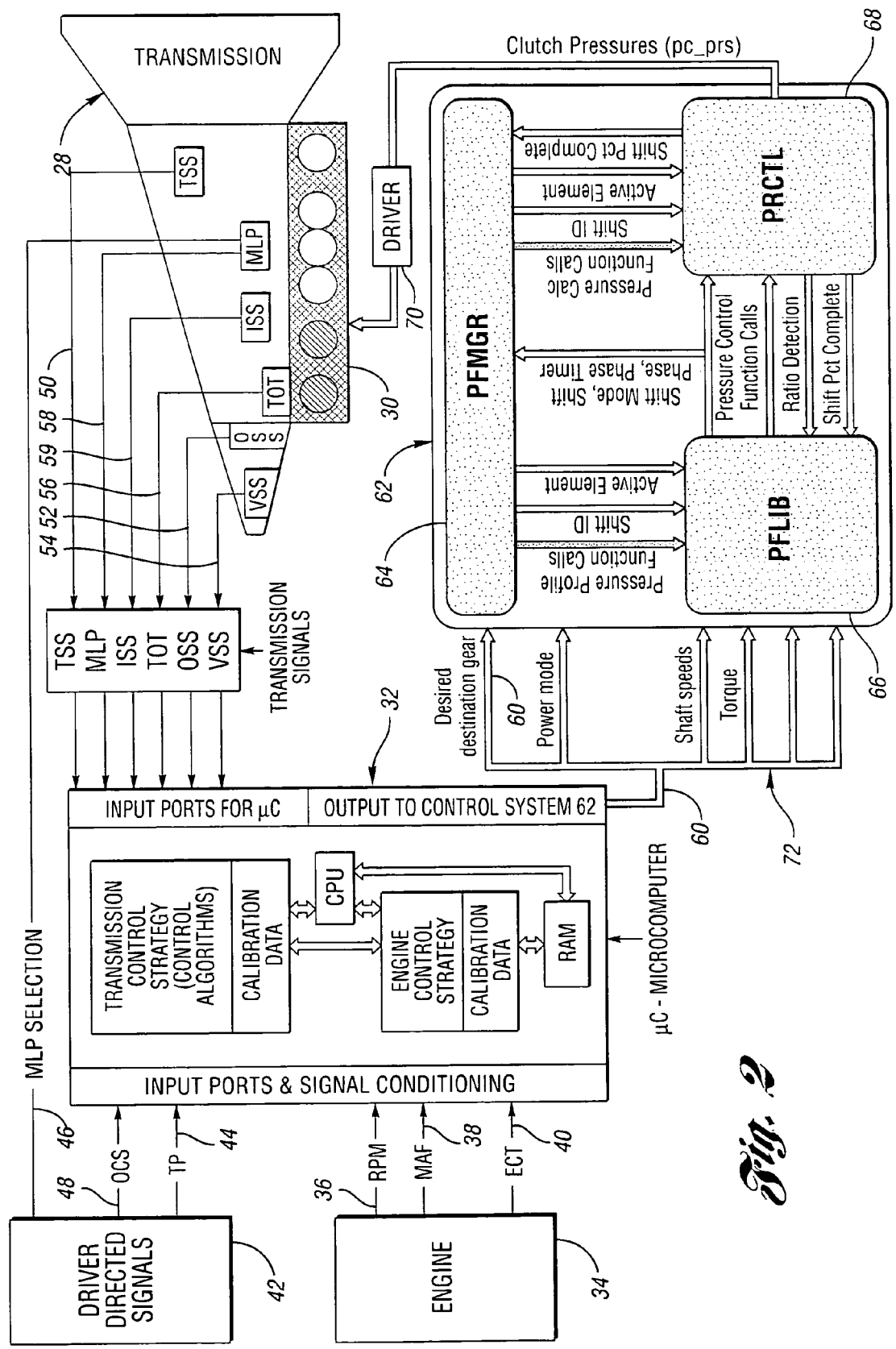
FIG. 2 is a schematic view of the overall architecture for a powertrain controller incorporating the invention.

The architecture for the control system of the invention is indicated generally in outline form in FIG. 2. The transmission is shown at 28. A transmission hydraulic control circuit for the transmission 28, shown at 30, is under the control of a microprocessor controller 32, which may include both engine control strategy and transmission control strategy. The engine is shown at 34. The input ports and a signal conditioning portion of the microprocessor 32 receive engine data, such as speed data 36, mass air flow data 38, and engine coolant temperature data 40. Microprocessor 32 also receives selected driver-directed input signals from driver input 42. Typical driver-directed input signals would be the engine throttle position signal 44, the manual lever position selector position 46 and the overdrive cancel switch 48. The manual lever position selector information (MLP) is distributed directly to the transmission 28, which determines a manual valve position signal 58.

The controller 32 receives feedback signals from the transmission including turbine speed sensor signal 50, output shaft speed signal 52, vehicle speed signal 54, transmission oil temperature signal 56, manual valve position signal 58, and intermediate shaft speed signal 59.

The transmission control strategy under the control of the CPU portion of the processor (or controller, or microcomputer μc) 32 will develop a desired destination gear, as shown at 60. The algorithms executed by the CPU, which are stored in memory registers, are executed in response to the input variables from the driver and the engine, as well as the feedback variables from the transmission, to develop a desired destination gear, which is distributed to the pressure control system indicated generally in FIG. 2 by reference numeral 62.

The control system architecture indicated in FIG. 2 includes a pressure profile manager sub-module 64, a pressure function library sub-module 66, and a pressure control function sub-module 68. Clutch pressure commands are developed by the control system 62 and transferred to output driver 70, which communicates with the hydraulic control system 30 for the transmission 28.

The desired destination gear is developed by the controller 32, and the execution of the destination gear command is carried out by the control system 62. The result of the execution of the input data by the control system 62 involves a command pressure that is delivered to each clutch independently. In an ideal arrangement, there would be one solenoid dedicated to the control of each clutch or friction element in the control system 30 for the transmission 28. The output pressure commanded by the system 62 is based on the desired gear and the current operating conditions, such as transmission temperature, input torque, shaft speeds, etc. These inputs are generally indicated at 72.

The software for control system 62 thus acts as an interface between the output driver circuits of the transmission microprocessor controller 32 and the hydraulic control system 30 of the transmission. It ensures that the appropriate pressure is delivered to each clutch or brake friction element under all driving conditions.

The profile manager 64 provides the highest level of control for the entire pressure control system. It is responsible for processing all changes in the desired gear, during either shifting or non-shifting. It functions as well to control a so-called change-of-mind shift event, where a given gear sequencing is interrupted by a new instruction given by the operator for a different destination gear. For example, if a 1-3 shift is commanded, the control system is configured to command a sequential 1-2-3 shift for normal sequencing. It identifies the active elements, the pressure profiles and the timing of the start of each shift.

The profile library sub-module 66 specifies the pressure control action that is required to apply or to release an element during a shift or an engagement of a clutch or brake. It consists of separate states, such as boost, stroke, closed-loop control, etc., which are needed to complete a shift.

Sub-module 66 comprises a library of several profiles required to complete all shifts or engagements. The profiles that are required for a particular transmission depend upon the kinematic requirements of the transmission. The pressure profiles required for a synchronous shift, for example, are different than those required for a swap-shift.

The pressure control sub-module 68 consists of a collection of algorithms used for the purpose of pressure calculations using the inputs delivered to the system 62. Both the manager 64 and the profile library 66 use calculations in sub-module 68 to monitor the status of each shift and to provide calculations of variables, such as starting torque, to other regions of the pressure control.

The pressure profiles, the selection of transmission elements that are affected during a shift, and the gear sequencing can be changed by appropriately calibrating the program manager 64. Further pressure profiles can be added or deleted depending upon the transmission requirements.

Figure 3:
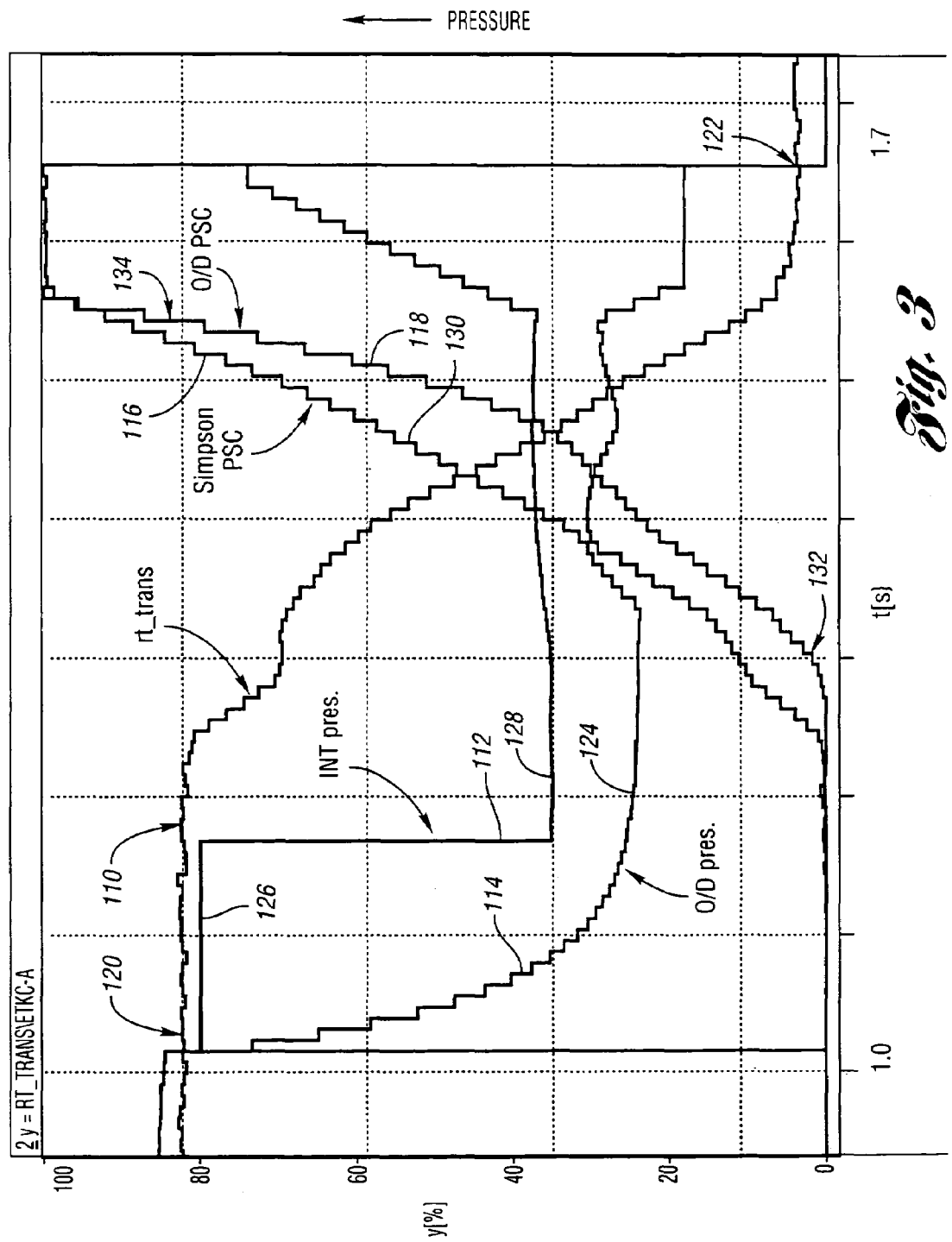
FIG. 3 is a plot of the pressures on the friction elements for the overdrive gearset and the Simpson gearset involved in a swap-shift during progression of the swap-shift.

FIG. 3 is a plot of the overdrive clutch pressure, the intermediate clutch pressure, the overall transmission ratio, and the percent shift completion plots for the Simpson gearset and the overdrive gearset during a power-on 2-3 upshift event. The shift progression, expressed as percentages, is shown on the ordinate of FIG. 3, together with pressure. The overall transmission ratio is plotted as shown at 110, the intermediate clutch pressure is plotted as shown at 112, the overdrive clutch pressure is plotted as shown at 114, the percent shift complete at any instant during a shift event for the Simpson gearset is shown at 116, and the percent shift complete for the overdrive gearset at any instant during the shift event is shown at 118. At the beginning of the shift, the overall transmission ratio at point 120 in the embodiment of the invention described with reference to FIG. 2b is 2.201. At the end of the shift, at point 122, the overall transmission ratio for the transmission described with reference to FIG. 2b is 1.538. To effect a 2-3 upshift, the overdrive friction element must be released and the Simpson gearset friction element must be applied. Thus, the overdrive pressure shown at 114 is dropped, beginning at point 120, until it reaches a low value, as shown at 124.

Intermediate clutch pressure is distributed to the intermediate friction element at a high value following initiation of the shift, as shown at 126. This high value is needed to fill the clutch and stroke the clutch so that torque capacity can be gained to initiate movement of the actuator piston for the intermediate clutch friction element, as slack is overcome. The value for the intermediate clutch pressure is dropped after the initial pressure build-up to a low value, as shown at 128. This low pressure value corresponds to the theoretical starting torque needed to start the ratio change of the Simpson gearset. The Simpson gearset then begins its ratio change, and the percent shift complete for the Simpson gearset, shown at 116, begins to rise almost linearly, as shown at 130.

When the overdrive gearset clutch pressure falls to a low value, as shown at 124, the overdrive gear ratio will begin to change. As demonstrated by the overdrive percent-shift-complete curve 118, the point 132 at which the overdrive gearset begins its ratio change is later than the beginning of the application of the intermediate clutch of the Simpson gearset.

The completion of the shift of the overdrive gearset at point 134 on the plot 118 occurs earlier than the completion of the application of the Simpson gearset intermediate clutch.

The data in FIG. 3 represent actual readings recorded in a test set-up for a transmission embodiment of the type shown in FIGS. 2a and 2b.

Figure 4:
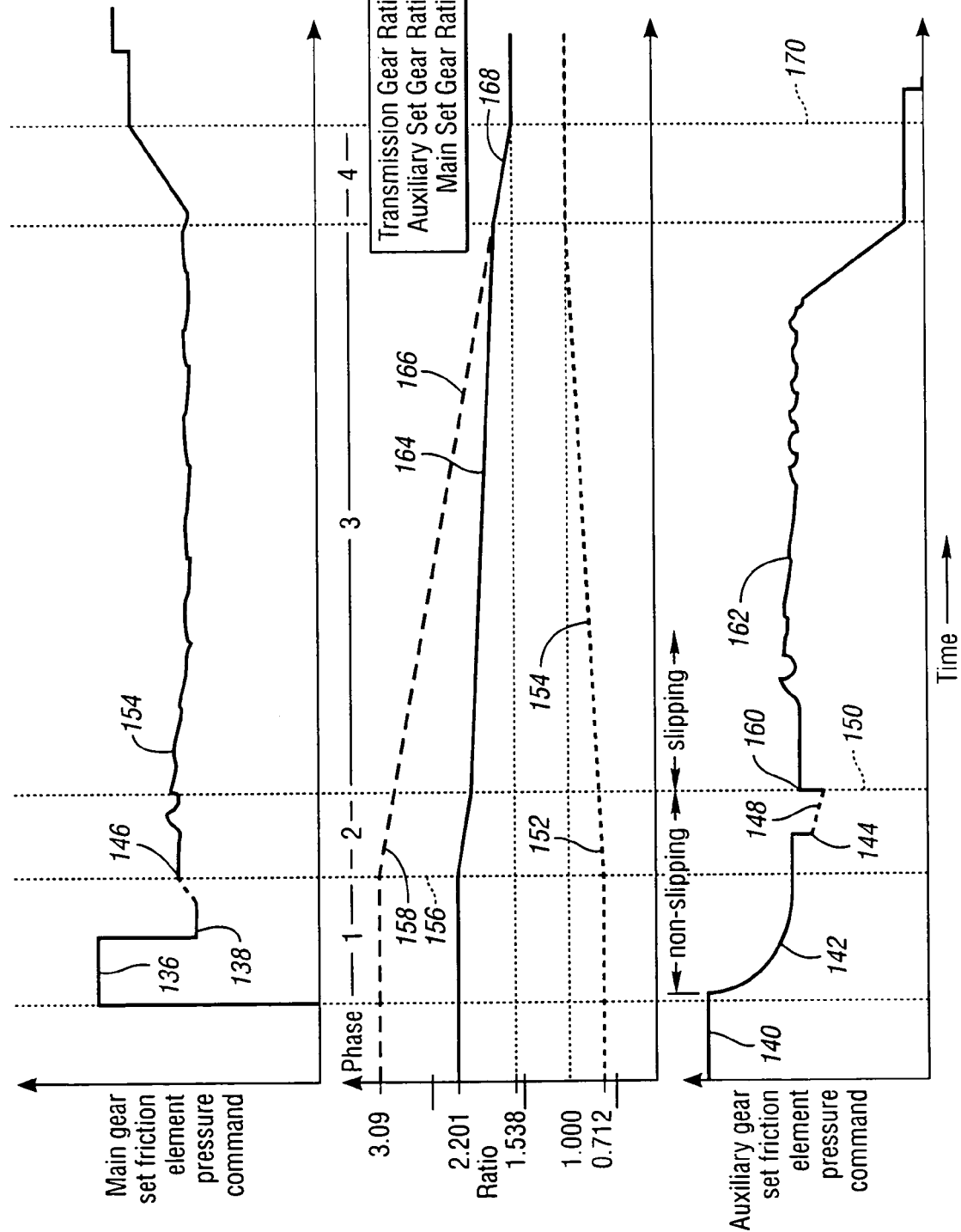
FIG. 4a is a time plot of the Simpson gearset friction element pressure command versus time during a power-on swap-upshift.
FIG. 4b is a time plot of the overall ratio, as well as the overdrive gearset ratio and the Simpson gearset ratio during a power-on swap-shift.
FIG. 4c is a time plot of the overdrive gearset friction element pressure command during a power-on swap-upshift.
Figure 5:
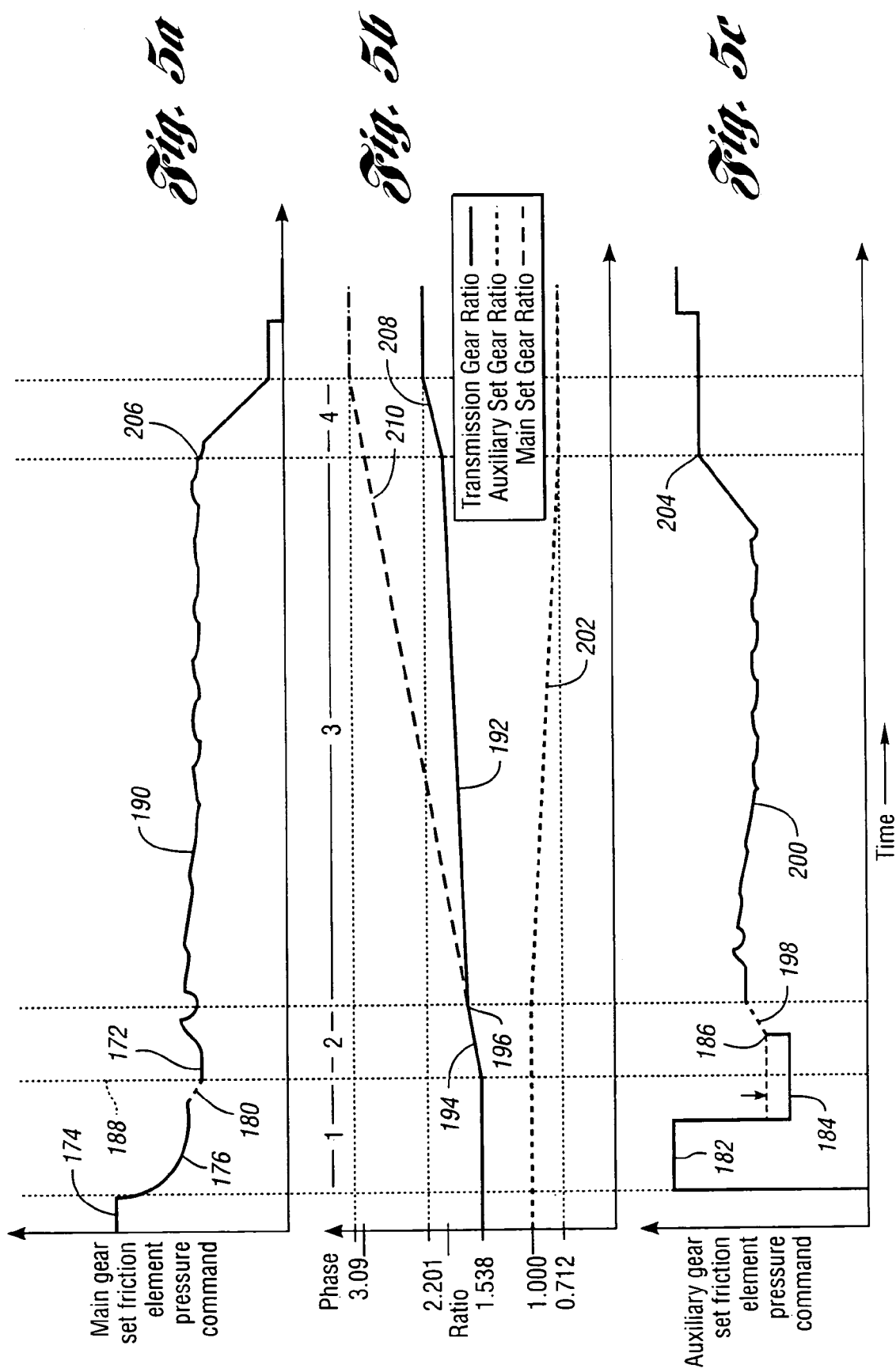
FIG. 5a is a plot corresponding to FIG. 4a, but which shows the Simpson gearset friction element pressure command during a power-on swap-downshift.
FIG. 5b is a plot corresponding to FIG. 4b showing the overall gear ratio of the overdrive gearset ratio and the Simpson gearset ratio during a swap-downshift.
FIG. 5c is a plot corresponding to FIG. 4c showing the overdrive gearset friction element pressure command during a swap-downshift.

For the purpose of schematically illustrating the software that will accomplish the swap-shifts, including the power-on 2-3 upshift described with reference to FIG. 3, a swap-shift will first be described with reference to FIGS. 4a, 4b and 4c. A corresponding description for a power-on 3-2 swap-downshift will be described with reference to FIGS. 5a, 5b and 5c.

For purposes of the description of a swap-shift with reference to FIGS. 4a–5c and FIGS. 7a–8b, the Simpson gearset may be referred to as the main gearset and the overdrive gearset may be referred to as the auxiliary gearset.

One objective of the software for controlling swap-upshifts and swap-downshifts is to envelop the downshift of the overdrive gearset within the time frame for an upshift of the Simpson gearset. Similarly, overdrive gearset upshifts will be enveloped within the time frame for a downshift of the Simpson gearset. Further, the rate of ratio change of the overdrive gearset must be less than the rate of ratio change of the Simpson gearset. Also, the start of the downshift of the overdrive gearset ideally should be set as close as possible to the start of the Simpson gearset upshift. Similarly, the end of the downshift of the overdrive gearset must be set as close as possible to the end of the Simpson gearset upshift.

In FIG. 4a, the Simpson gearset friction element pressure command increases the friction element pressure, as shown at 136. This high pressure will initiate the engagement of the Simpson gearset friction element. The friction element is stroked so that torque capacity is gained. The Simpson gearset friction element pressure then is commanded to a low value, as shown at 138. This low value corresponds to the theoretical starting pressure needed to start the Simpson gearset ratio change. Simultaneously, the overdrive gearset friction element pressure command, which initially was at a value at least high enough to ensure that the friction element for the overdrive set is not slipping, even during input torque changes, and to maintain capacity of the weakest friction element in the transmission. Overdrive gearset friction element command pressure at 146 in FIG. 4c is gradually decreased, as shown at 142, until it reaches a low value, as shown at 143. This value is slightly above the theoretical starting pressure at 144, which would start the overdrive gearset ratio change. Prior to the decrease in the overdrive gearset friction element pressure from 143 to 144, the Simpson gearset friction element pressure can be commanded to rise, as shown at 146 in FIG. 4a, until the Simpson gearset ratio change starts. As soon as the Simpson gearset ratio progression proceeds to a point selected by a calibrator of the system, the overdrive gearset pressure is commanded to a value at 144 in order to start the overdrive gearset ratio change.

At 143, there is sufficient capacity in the overdrive gearset so that the overdrive gearset will not begin its ratio change. After the overdrive gearset friction element pressure is commanded to the starting pressure at 144, the pressure of the overdrive gearset is gradually reduced in friction element state 2, as shown at 148 in FIG. 4c, to ensure that the overdrive gearset ratio change will start at time 150.

The overdrive gearset ratio plotted in friction element state 2 in FIG. 4b is a straight line. The overdrive gearset ratio begins to rise, as shown at 154, only after the time that the downshift of the overdrive gearset begins at 150.

The Simpson gearset friction element pressure enters closed-loop control, as shown at 166, beginning at time 156. Starting at time 156, the slope of the Simpson gearset ratio becomes negative, as shown at 158. The ratio change of the Simpson gearset is controlled by the controller in a closed-loop fashion, and the rate of change of the transmission ratio will follow that of the Simpson gearset ratio since the overdrive gearset has not started its downshift prior to the time 150.

The plot of FIGS. 4a, 4b and 4c represents a power-on upshift, which uses closed-loop control. A power-off upshift would not use a closed-loop control.

The commanded pressure for the overdrive gearset at time 150 is the actual starting pressure 145, which causes the overdrive gearset ratio change to start. After the overdrive gearset ratio change starts at time 150, the pressure is immediately commanded to rise to a slightly higher value at 160 to account for changes in the dynamics of a change in coefficient of friction (i.e., static vs. dynamic coefficients of friction). The increased pressure following the decrease at 148 will avoid a flare-up in the speed of sun gear of the overdrive gearset at the beginning of the downshift of the overdrive gearset. At that point, closed-loop control of the overdrive gearset will begin, as shown at 162 in the case of a power-on 2-3 upshift. If the upshift occurs with power-off, when engine power delivery to the traction wheels is interrupted (the overrunning clutches overrun), the control would be open-loop.

As indicated at the central regions of FIGS. 4a, 4b and 4c, there is a simultaneous ratio change for both the Simpson gearset upshift and the overdrive gearset downshift. The overdrive gearset downshift is achieved by controlling the pressure of the friction element. Once the overdrive gearset begins its downshift, the transmission rate of ratio change will decrease, as shown at 164. Also, at the start of the overdrive gearset downshift, changes in static and dynamic friction coefficients are accounted for by commanding an increase in the friction element pressure, as shown at 160. The Simpson gearset and the overdrive gearset dynamically interact with each other during this simultaneous ratio change, as will be explained subsequently. During a power-on 2-3 upshift, the ratio change control for both the Simpson gearset and the overdrive gearset is handled by two coupled closed-loop controllers. A power-off shift, in contrast, uses an open-loop control at this time.

The overdrive (auxiliary) gearset time plot is shown in FIG. 4c. At time 151 in FIG. 4c, the selectable overdrive progression is reached. The control from time 150 to 151 is closed-loop. The control from time 151 to the end of the upshift is open-loop. This occurs in FIG. 4c during friction element state 3. Control of pressure before time 150 in friction element state 1 also is open-loop. During closed-loop control, the friction element for the overdrive (auxiliary) gearset is slipping. Slipping stops at time 153 after the pressure is ramped down to zero slip using open-loop control. The friction element state beginning at time 153 is identified in FIG. 4c as state 4.

The actual start pressure for the overdrive gearset friction element occurs at 145 following the pressure ramp-down at 148.

The overdrive gearset should finish its downshift before the Simpson gearset finishes its upshift. When that occurs, the overall ratio change, as shown at 164, will follow the ratio change for the Simpson gearset, as indicated at 168. The upshift is completed at time 170.

FIG. 5a is a plot of the Simpson gearset friction element pressure command during a downshift as distinct from the upshift described with reference to FIGS. 4a, 4b and 4c. FIG. 5a shows that the Simpson gearset is prepared for its ratio change by reducing the capacity of the friction element down to its starting pressure at 172. At the beginning of the downshift, the pressure is at a high value as shown at 174. That pressure is high enough to ensure that the Simpson gearset friction element pressure command will prevent slipping. It will maintain capacity of the weakest friction element in the transmission.

The pressure is gradually decreased, as shown at 176, to maintain stability and avoid hunting of the pressure value due to pressure overshoot. The pressure of the Simpson gearset friction element is mildly ramped down, as shown at 180, to start the downshift of the Simpson gearset, which occurs at time 188. In the case of the overdrive gearset, a swap-downshift requires an initial boost in the overdrive clutch pressure, as shown at 182, to condition the overdrive gearset friction element for torque delivery. The pressure then is dropped, as shown at 184, to a value below the starting pressure indicated at 186. This ensures that the commanded pressure will not start the upshift of the overdrive gearset.

The downshift of the Simpson gearset will begin at time 188, as shown in FIG. 5a. The ratio change in the Simpson gearset will be accomplished by controlling pressure in a closed-loop fashion, as shown at 190. The rate of the transmission ratio change indicated at 192 will follow the rate of change of the Simpson gearset ratio, as shown at 194, at the beginning phase of the Simpson gearset downshift. At point 196 in FIG. 5b, the transmission ratio will begin to have a lesser slope because the overdrive gearset now begins to change its ratio. As in the case of a power-on swap-upshift, the pressure is controlled for both the Simpson gearset and the overdrive gearset during a downshift in a closed-loop fashion, whereas open-loop control is used for power-off downshifts.

As previously explained, the friction element pressure for the overdrive gearset initially is held below its starting pressure (186) until the Simpson (main) gearset ratio progression reaches a calibrated shift progression point, at which time the overdrive friction element pressure is commanded at pressure level 186 to start the overdrive gearset ratio change. To ensure that the overdrive gearset ratio change starts, pressure is ramped up, as shown at 198 until the overdrive gearset ratio change is detected, at which point overdrive gearset ratio change closed loop control begins. This upward ramping of the starting pressure is done in order to accommodate any errors in the starting pressure that may exist.

During closed-loop control of the overdrive gearset, as shown at 200 in FIG. 5c, the overdrive gearset ratio will decrease as shown at 202 in FIG. 5b. As soon as the slope of the overdrive gearset ratio becomes negative, the transmission gear ratio slope will decrease as shown at 192, since both the overdrive gearset and the Simpson gearset are changing ratios.

During the closed-loop control indicated at 190 and at 200 in FIGS. 5a and 5c, respectively, the Simpson gearset and the overdrive gearset dynamically interact with each other during their simultaneous ratio changes.

At point 203, after a calibratable overdrive gearset shift progression is reached, closed-loop control for the overdrive gearset is stopped. Overdrive friction element pressure then is ramped up for the remainder of the overdrive gearset ratio change at 204.

As indicated in FIG. 5c at 204, the overdrive gearset is finished with its ratio change, which is an upshift, and the Simpson (main) gearset has not yet finished its ratio change, which is a downshift, as shown at 207 in FIG. 5a. After the overdrive gearset ratio change is completed, the slope of the gear ratio plot for the Simpson gearset follows the slope of the plot of the transmission gear ratio, as shown at 208. The gear ratio for the Simpson gearset being shown at 210 in FIG. 5b. At point 206, after a calibratable Simpson gearset shift progression is reached, closed-loop control for the Simpson gearset is stopped. Simpson gearset friction element pressure is ramped down for the remainder of the Simpson gearset ratio change, as shown at 207.

The control methodology for a 2-5 swap-shift is the same as that for the 2-3 swap-shift. Similarly, the control methodology for a 5-2 swap-shift is the same as that for a 3-2 swap-shift.

Figure 6:
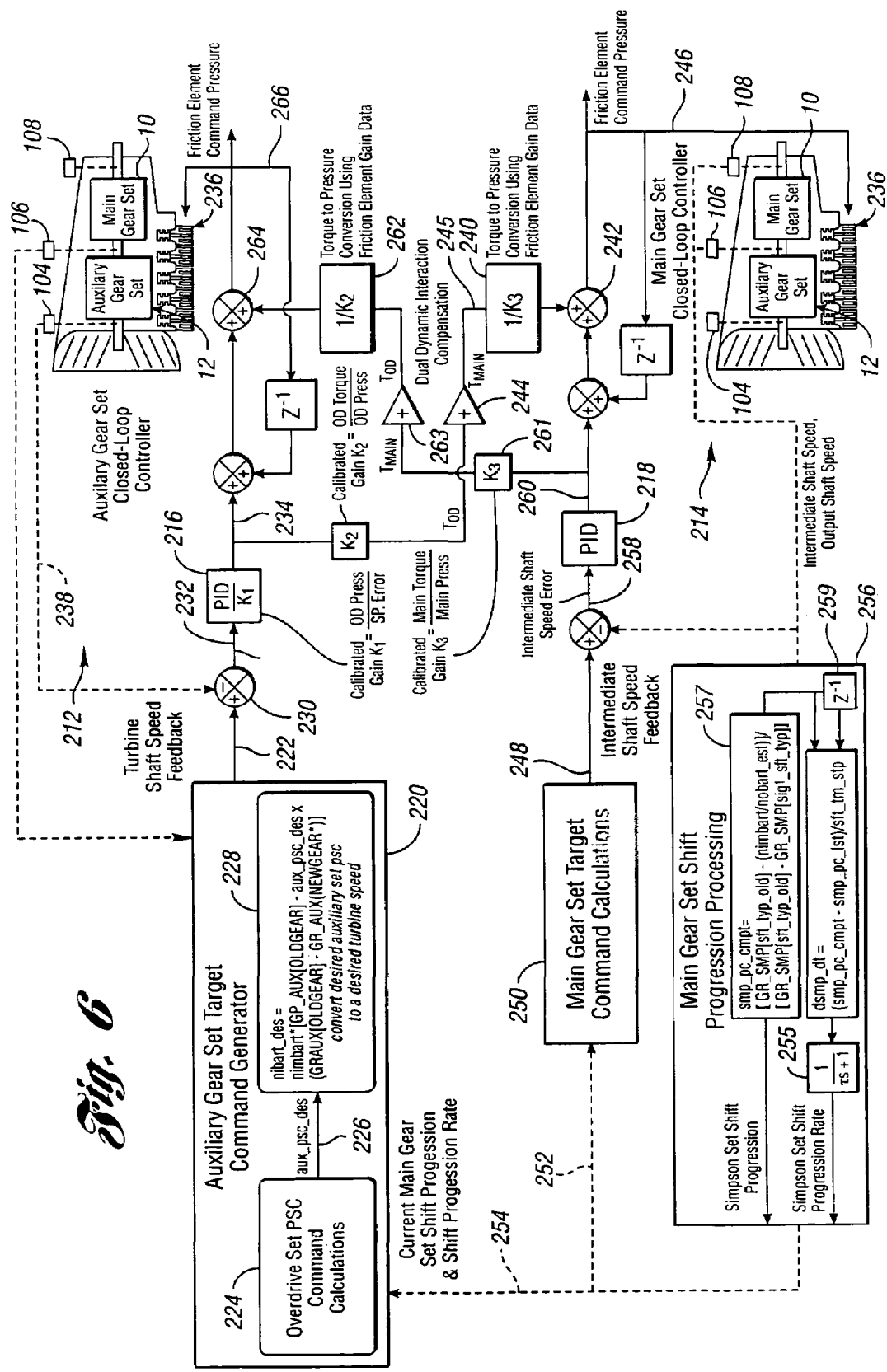
FIG. 6 is a schematic diagram of the overall control system for a swap-shift, closed-loop, coordinated control with dynamic interaction compensation.

The closed-loop coordinated control for the overdrive (auxiliary) gearset and the Simpson (main) gearset is illustrated in schematic form in FIG. 6. The overdrive (auxiliary) gearset closed-loop controller is shown in FIG. 6 at 212 and the Simpson (main) gearset closed-loop controller is shown at 214. Each gearset has its own PID (proportional, integral, derivative) controller. The PID controller for the overdrive gearset is shown at 216 and the PID controller for the Simpson gearset is shown at 218.

An auxiliary gearset target command generator 220 monitors the progression of the shift in the Simpson gearset. It computes a target command for the overdrive gearset controller. It calculates a desired turbine speed, shown at 222, using desired overdrive gearset percentage shift complete command calculations, shown at 224. The output of the calculations at 224 is a desired percent shift complete value at 226. That value is converted to a desired turbine speed, as shown at 228. The conversion of speed error at 232 to pressure at 234 is computed at 216 using a gain factor $K_1$, which is a calibrated value equal to OD pressure divided by turbine speed error.

The actual turbine speed is measured by a sensor 104 and is compared at comparator 230 to the desired turbine speed 222. Any error in these speed values is seen at 232 and is distributed to the PID controller 216. The output of the PID controller is a pressure value at 234, which is distributed to the solenoid-operated pressure control valves at 236 for the overdrive gearset. The turbine speed feedback control loop is shown at 238. Calibrated gain data $K_2$ is used to convert pressure to torque for the overdrive (auxiliary) gearset, where $K_2$=overdrive torque/overdrive pressure. Calibrated gain $K_3$ is used to convert pressure to torque for the Simpson (main) gearset, where $K_3$=Simpson gearset friction element torque/Simpson pressure.

The computed overdrive gearset pressure at the output side of the PID controller 216 is converted to overdrive gearset friction element torque using $K_2$, then converted to Simpson gearset friction element torque (245) using swap-crosslink gain 244 to account for dynamic interaction between the two gearsets. Simpson element torque 245 is converted to Simpson element pressure 240 by dividing by gain $K_3$. The output of the torque-to-pressure conversion is distributed to summing point 242, which, in turn, is distributed as shown at 246 to the solenoid-operated pressure control valves for the main gearset at 236. This feature is part of the dual dynamic interaction compensation for disturbances from the desired pressure build-up or pressure decrease in the overdrive gearset, which will have an effect on the pressure build-up or the pressure decrease for the Simpson gearset.

The controller 214 for the Simpson gearset includes a controller for determining desired intermediate shaft speed at 248. The desired speed at 248 is determined at 250 where the Simpson gearset target command calculations occur. This is done using a shift complete rate calibration using test data to determine a desired rate. That value is integrated with respect to time to produce a desired percentage shift complete value, which is then converted to a desired intermediate shaft speed.

The Simpson gearset shift progression and shift progression rate are monitored at 256 using outputs from the speed sensors 106 and 108. The Simpson gearset shift progression monitored at 256 affects the Simpson gearset target command calculations at 250 as well as the overdrive gearset target command calculations at 220.

The desired intermediate shaft speed at 248 is compared to the intermediate speed monitored by the speed sensor 106. The intermediate shaft speed error at 258 is distributed to controller 218. Conversion from an error to pressure 218 is accomplished using gain data in a fashion similar to the conversion explained previously with respect to PID controller 216. The output of the PID controller 218 is a pressure at 260, which is converted to a Simpson (main) torque using gain $K_3$ at 261, then converted to an overdrive gearset friction element torque using swap-crosslink gain at 263 to account for dynamic interaction between the two gearsets. Overdrive gearset torque at 263 is converted to overdrive gearset element pressure at 262 by dividing by gain $K_2$.

The pressure at 262 is distributed to summing point 264, thus modifying the pressure distributed to the overdrive gearset friction element, as shown at 266.

The symbol $Z^{-1}$ at function block 256 represents the last Simpson gearset shift progression from the last control loop.

The symbol $Z^{-1}$ at the Simpson gearset controller 214 and at the overdrive gearset controller 212 represent feedback information from the last control loop as the controllers 214 and 212 compute their respective friction element command pressure. That feedback information is combined with the outputs of PID controllers 216 and 218 to update the friction element command pressures for the overdrive gearset friction element command pressure and the Simpson gearset friction element command pressure, respectively. The command pressures are computed for each control loop of the system 62.

The algorithm used by the auxiliary gearset target command generator 220 in FIG. 6 determines the desired overdrive gearset controller command during closed-loop control. This command generator ensures precise upshift and downshift synchronization between the two gearsets which use, as explained previously, independently controlled main and auxiliary gearset friction elements.

The generator 220 provides sufficient real-time correction to the desired overdrive gearset controller command to compensate for changes in the progression rate of the Simpson gearset during a swap-shift. The generator 220 computes the desired controller command for the overdrive gearset, such that the desired shift progression (PSC) profile relative to the shift progression of the Simpson gearset can be satisfied. Varying ratio change rates for the Simpson gearset are compensated for in real-time. It does not assume, unlike prior art control systems, that the Simpson gearset will shift in a linear manner. It modifies in real-time the target command for the overdrive gearset to accommodate actual ratio change rates of the Simpson gearset. This design approach is consistent with the high level swap-shift master slave concept previously described in which the Simpson gearset is the master and the overdrive gearset is the slave. The generator 220 is active only during the ratio change mode of the overdrive gearset once a ratio change has been detected.

The major inputs to the generator 220 are the Simpson gearset ratio change progression (PSC or ratio change) and the shift progression rate (PSC/sec or ratio change/sec). This value is calculated using measured intermediate and output shaft speeds obtained from the speed sensors 106 and 108. The Simpson gearset ratio change rate is calculated by taking the derivative of the Simpson gearset percentage shift complete. The other input to the generator 220 is the intermediate shaft speed from sensor 106.

The generator 220 uses these inputs to compute a desired overdrive gearset shift progression profile relative to that of the Simpson gearset. The generator 220 makes it possible to calibrate with tuning flexibility a desired overdrive gearset percentage shift complete profile using intermediate percentage shift complete target values, which are calibrated as a function of the Simpson gearset shift progression. A percentage shift complete calculation is equal to the old ratio at the start of the ratio change minus the current ratio divided by the overall ratio change span. The current ratio during the shift progression is equal to the input shaft speed divided by the output shaft speed.

For the overdrive gearset, the percentage shift complete calculation is determined by subtracting the ratio of the turbine speed to the intermediate shaft speed from the overdrive gearset ratio starting point. That value is divided by the difference between the overdrive gearset starting ratio minus the overdrive gearset final ratio.

A desired percentage shift complete for the overdrive gearset can be substituted in the foregoing relationship to compute the desired turbine speed at 222 in FIG. 6. Desired turbine speed is the unknown term in the foregoing relationship after the desired percentage shift complete term is computed.

The foregoing computation of desired turbine speed (Ntbart_des) is set forth in the following equations:

$$PSC\,OD\,des = \frac{\text{gear ratio } OD \text{ (start)} - \text{current } OD \text{ ratio}}{\text{overdrive ratio change span}} \times 100; \text{ but,} \quad (1)$$

$$\text{current } OD \text{ ratio} = \frac{\text{turbine speed } (Ntbart)}{\text{intermediate shaft speed } (Nimbart)}, \text{ and} \quad (2)$$

$$OD \text{ ratio change span} = \text{gear ratio } OD \text{ (start)} - \text{gear ratio } OD \text{ final.} \quad (3)$$

Therefore, $$PSC\,OD\,des = \frac{\text{gear ratio } OD \text{ (start)} - \dfrac{Ntbart\_des}{Nimbart}}{\text{gear ratio } OD \text{ (start)} - \text{gear ratio } OD \text{ (final)}}. \quad (4)$$

Thus, solving equation 4 for desired turbine speed gives:

$$Ntbart\_des = Nimbart * [(\text{gear ratio } OD \text{ start}) - PSC\,OD\,des\,(\text{gear ratio } OD \text{ start-gear ratio } OD \text{ final})]. \quad (5)$$

The foregoing calculations occur at 228 in action block 220 of FIG. 6. The inputs at 228 are the desired overdrive gearset percentage shift complete command calculations determined at block 224 in FIG. 6.

The inputs to the command generator that makes the overdrive gearset percentage shift complete calculations possible are obtained from action block 256, where the Simpson gearset percentage shift complete is calculated, as shown at 257. The computation that develops the Simpson gearset percentage shift complete value at 257 is obtained using the Simpson input speed from sensor 106 and the Simpson output speed from sensor 108 to develop a speed ratio, which appears in the equation set forth in FIG. 6. The denominator of the equation appearing in FIG. 6 is the difference between the Simpson gear ratio at the beginning of the shift and the Simpson gear ratio at the end of the shift.

The calculations in action block 256 also involve a calculation of a derivative of the Simpson gearset percentage shift complete with respect to time in order to compute the rate of change of the Simpson gearset shift progression. This value of the derivative is shown at 259 in FIG. 6. Both the Simpson gearset percentage shift complete value and the rate of change of the Simpson gearset percentage shift complete are distributed, as shown at 254, to the auxiliary gearset target command generator 220, as shown in FIG. 6. The rate of change of the Simpson gearset percentage shift complete is filtered by a first order filter, as shown at 255 in FIG. 6.

A percentage shift complete term can be used to indicate shift progression. Shift progression can be indicated as well, if so desired, by using a gear ratio term.

The Simpson percentage shift complete target computed at 250 is determined by using a desired percentage shift complete rate, which is a calibrated value, and integrating that value with respect to time to produce a percentage shift complete target value, which is used in the calculation of desired intermediate shaft speed at each target. This calculation is similar to the calculation described with reference to action block 228 in the calculation of desired turbine speed.

The overdrive gearset target command generator at 220 is responsible for determining the desired controller command for the overdrive gearset to ensure consistent shift synchronization with respect to the Simpson gearset regardless of variations in vehicle variables and environmental conditions over time. It provides a real-time adaptive control to predict future Simpson gearset ratio change progression variables, and it commands the overdrive gearset to compensate for those variables. Its adaptive characteristic is in real-time since it adapts to a current shift and immediately provides corrections.

Figure 7:
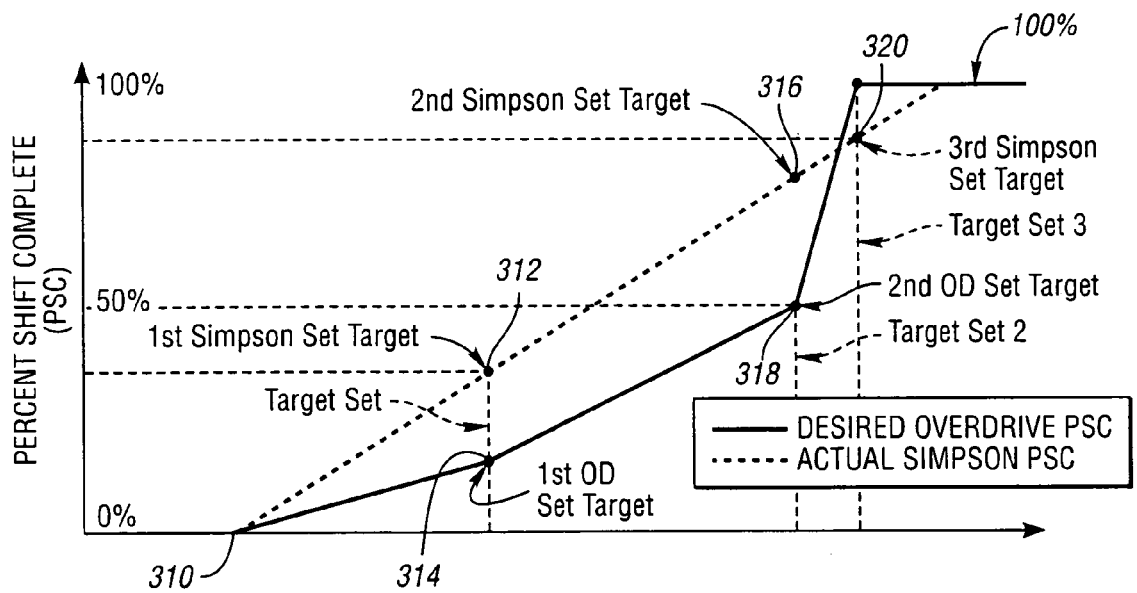
FIG. 7 is a plot of the percentage shift complete versus time at selected target points during a swap-shift progression for both the desired overdrive percentage shift complete and the actual Simpson percentage shift complete.

FIG. 7 is a plot of the desired OD and actual Simpson percentage shift complete values during progression of a swap-shift. The percentage shift complete values are plotted against time. At time 310 in FIG. 7, the swap-shift begins. A first Simpson gearset target value for a first target set is calibrated at 312.

A first overdrive gearset target value for the percentage shift complete is computed as shown at 314 in FIG. 7 based on the first calibrated Simpson gearset target value. The target values at 312 and 314 are a first target set for the controller. In a similar fashion, a second Simpson gearset target value for the percentage shift complete is calibrated, as shown at 316. A corresponding overdrive set target is computed, as shown at 318. The values at 316 and 318 form a second target set.

A third target set is obtained by calibrating a third Simpson gearset target for the percentage shift complete, as shown at 320. A third target value for the overdrive gearset is not needed since the overdrive gearset must be commanded to 100% of its shift when the Simpson gearset reaches the point 320.

Figure 9:
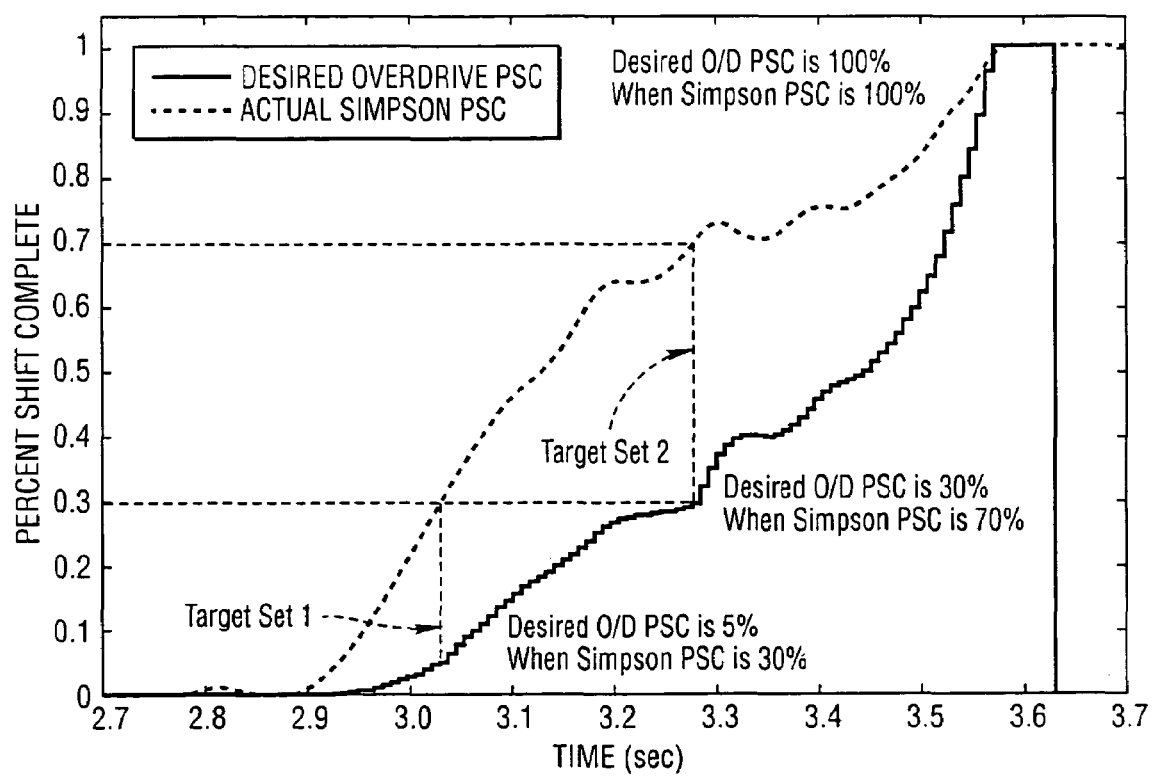
FIG. 9 is a plot corresponding to FIG. 8, but which shows an alternate calibration for the overdrive (auxiliary) gearset target command generator.

The target points that are illustrated in FIG. 9 are calibrated target points that can be located as desired by the control system calibrator. The degree of separation between the two plots for the desired overdrive gearset and the actual Simpson gearset can be varied as desired based upon empirical data. Regardless of the shape of the plots, however, it is necessary for the overdrive gearset percentage shift complete value to reach its maximum level at 100% when the Simpson percentage shift complete plot reaches its third target value.

Figure 8:
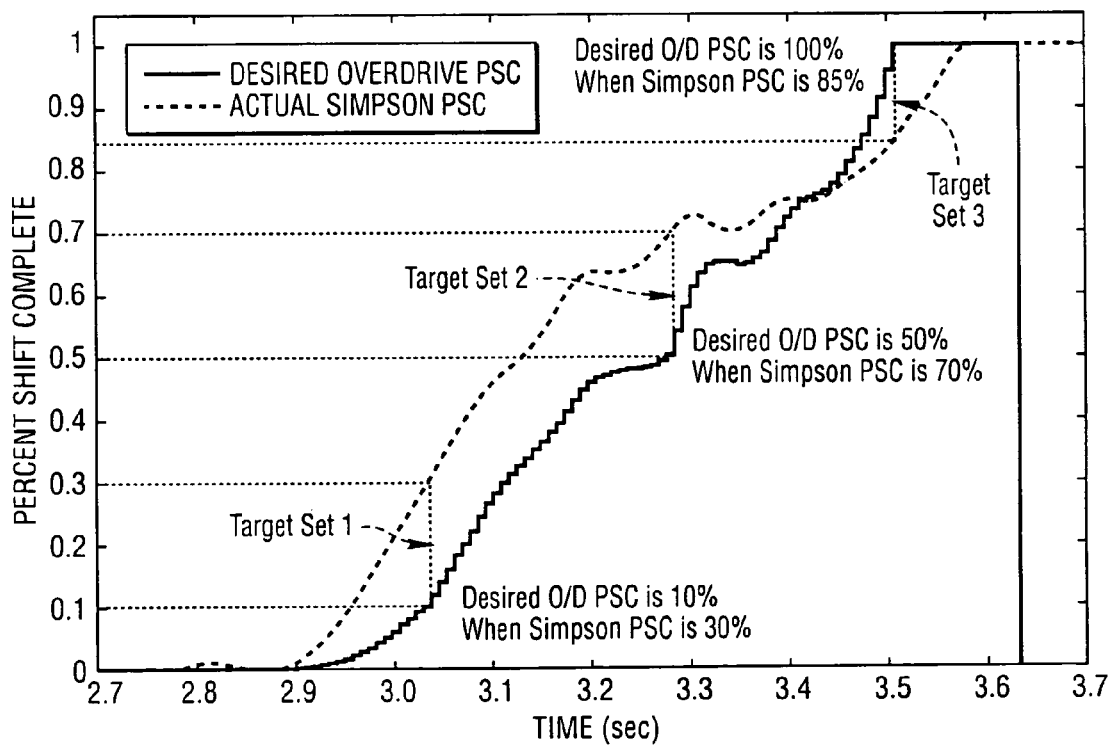
FIG. 8 is a plot of the desired overdrive gearset and actual Simpson gearset percentage shift complete values versus time using actual powertrain test data.

Other examples of percentage shift complete plots for the overdrive gearset and the Simpson gearset with varying degrees of separation between the plots are shown in FIGS. 8–11. In the case of FIG. 9, the desired overdrive gearset percentage shift complete is only 5% at the time that the Simpson gearset percentage shift complete is 30%, in contrast to the desired overdrive percentage shift complete plot for target set 1 in FIG. 8. In FIG. 8, the spacing of the plots for the desired overdrive percentage shift complete and the Simpson percentage shift complete are spaced closer together as a result of using a different calibration of target sets for generator 220. The target values for the second target set also are different from the target values selected for the plot of FIG. 8. Therefore, the spacings of the PSC plots are substantially different.

Figure 10:
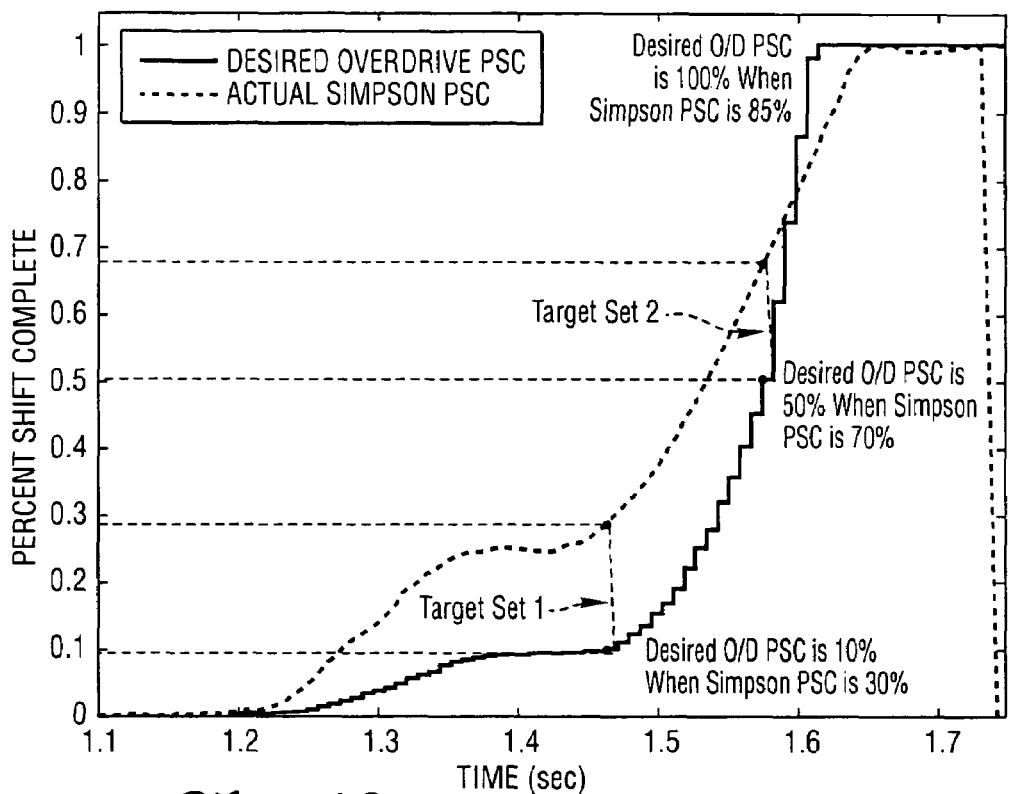
FIG. 10 is a plot corresponding to the plot of FIG. 8, using the same calibration, but using yet another different actual Simpson percentage shift complete test data.
Figure 11:
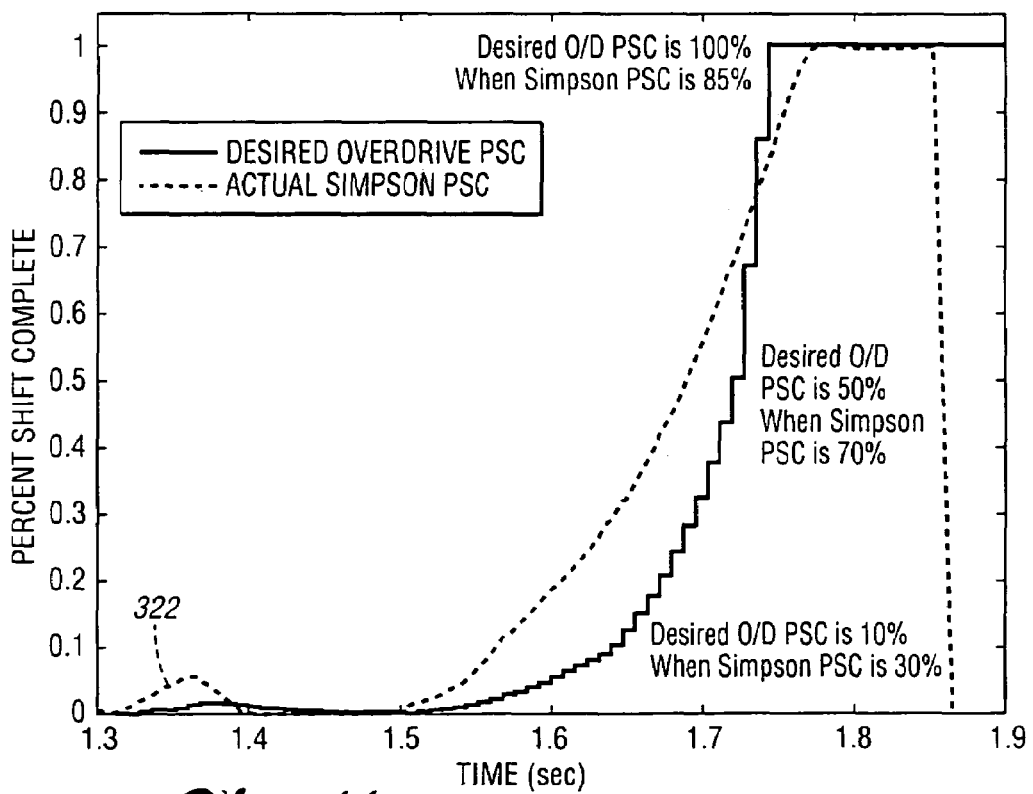
FIG. 11 is a plot corresponding to FIG. 8, using the same calibration for the percentage shift complete for both the overdrive gearset and the Simpson gearset.

FIGS. 8, 10 and 11 all use the same calibration for target set values, but they show the operation of the generator given different actual Simpson percentage shift complete test data. In all three figures, the generator 220 ensures that the OD gearset reaches its targets according to the Simpson gearset selected calibration. This illustrates how the algorithm is sufficiently robust to accommodate varying shift progressions of the Simpson gearset.

The overdrive gearset target command generator ensures that the desired overdrive set percentage shift complete is commanded by the time the actual Simpson gearset percentage shift complete plot reaches the calibrated value regardless of changes in the Simpson gearset ratio change rate. For each of the sets of the intermediate percentage shift complete targets, the generator accomplishes this task by estimating the time remaining before the Simpson gearset reaches the calibrated percentage shift complete point. The estimated time is computed using the current Simpson gearset change rate information, which, as explained previously, was computed by taking the differential of the percentage shift complete value for the Simpson gearset. Therefore, as the Simpson gearset ratio change rate is changing, the estimated time before reaching the calibrated intermediate percentage shift complete target point will also change. This estimated time is also the time interval by which the desired intermediate target overdrive gearset percentage shift complete is to be commanded.

Using the estimated time remaining before the Simpson gearset percentage shift complete will reach the calibrated value, a desired overdrive gearset shift progression rate is computed. The desired intermediate target overdrive gearset percentage shift complete to be reached and the last commanded overdrive gearset percentage shift complete are also used when computing the desired overdrive gearset percentage shift complete rate. To compute the desired overdrive gearset percentage shift complete, the desired percentage shift complete rate is simply integrated, as explained previously.

Finally, since the swap-shift closed-loop control scheme is speed-based, a desired turbine speed is computed based on the desired overdrive gearset percentage shift complete, the current intermediate shift speed, the initial overdrive gearset ratio (before the shift) and the final overdrive gearset ratio (after the shift).

A flow diagram of the algorithm used in the overdrive gearset target command generator is shown in FIG. 12. At the outset of the routine of FIG. 12, the last desired overdrive gearset percentage shift complete during the preceding control loop is stored, as shown at 324. If the Simpson gearset percentage shift complete is less than the first percentage shift complete target, which is determined at 326, then the desired overdrive gearset percentage shift complete rate is computed using the first intermediate target set, as shown at 328.

If the Simpson gearset percentage shift complete is not less than the first target, an inquiry is made at 330 as to whether the Simpson gearset percentage shift complete is less than the second percentage shift complete target. If it is less than that target, the desired overdrive gearset percentage shift complete rate is computed at 332 using a second intermediate target set.

If the decision at 330 is negative, the routine will proceed to action block 334 to compute a desired overdrive gearset percentage shift complete rate using the third intermediate target set. The computations that are desired at action blocks 328, 332 and 334 are carried out in the sub-set of the control routine shown in FIG. 14 at 336. At the beginning of the sub-routine at 336, a check is made to determine if the Simpson gearset percentage shift complete rate is approximately zero, as shown at 338. If it is approximately zero, the Simpson gearset shift progression is halted, as indicated at 340. At that point, the overdrive gearset percentage shift complete is frozen and the desired percentage shift completion rate is set to zero. That ends the sub-routine.

The output of the sub-routine is computed, as shown at 342, where the desired overdrive gearset percentage shift completion rate is integrated to compute the desired overdrive gearset percentage shift completion. The overdrive gearset percentage shift completion rate is limited to 100%, so the value computed at 342 is clipped to that percentage, as shown at 344. The routine then proceeds to action block 346 where the desired overdrive gearset percentage shift complete is converted to turbine speed for use by the PID controller 216. As described with reference to FIG. 6, that computation is based on the desired overdrive gearset percentage shift complete, the current intermediate shaft speed and the initial and final overdrive gearset ratios.

If the Simpson gearset percentage shift complete rate is not zero, as determined at 338, the routine will proceed to action block 348, rather than to action block 340. At action block 348, there is an estimate of the time remaining before the Simpson gearset reaches the percentage shift completion target value. After estimating that time, a determination is made at 350 as to whether the remaining time is less than the sampling time interval. If it is not less than the sampling time interval, the routine will proceed to action block 352, where the desired overdrive gearset percentage shift complete rate is computed. If the time remaining determined at 350 is less than the sampling time interval, the time remaining for the overdrive gearset to reach its target value is clipped so that it is the same as the sampling time interval and the routine at 352 then is begun.

The computation at 352 is based on the estimated time remaining before the Simpson gearset reaches the percentage shift complete point at the target value, the last commanded overdrive gearset percentage shift complete and the intermediate target value. The output of the sub-routine at 336 then is input to the action block 342, as previously indicated.

Although an embodiment of the invention has been particularly disclosed, it will be apparent to persons skilled in the art that modifications may be made without departing from the scope of the invention. All such modifications and equivalents thereof are intended to be covered by the following claims.

What is claimed is:

1. A shift progression target command generator for a closed-loop controller for a multiple-ratio automatic transmission for an automotive vehicle, the transmission comprising:

two gearsets for providing multiple torque flow paths between an engine and vehicle traction wheels, each gearset being characterized by at least two ratios that define multiple overall transmission ratios;

each gearset including a pressure-actuated friction element for establishing an upshift and a downshift between the two ratios;

a first closed-loop controller for controlling pressure at the pressure-actuated friction element of one gearset; and a second closed-loop controller for controlling pressure at the pressure-actuated friction element of the other gearset;

one gearset being upshifted as the other gearset is simultaneously downshifted, thereby effecting a swap-shift in an overall transmission ratio;

a shift progression and shift progression rate processing unit for the other gearset;

the generator computing a command for one of the gearsets based on a first shift progression target for the one gearset, the first shift progression target corresponding to a first shift progression target for the other gearset, whereby shift progression of the one gearset is dependent on shift progression and shift progression rate of the other gearset;

the target command generator using multiple sets of shift progression target values for the gearsets, each target value for the one gearset being dependent upon a target value for the other gearset;

the first and second controllers having dynamic interaction whereby a pressure change in one of the friction elements will command a pressure change in the other friction element during progression of the swap-shift, which results in improved quality of the swap-shift in the overall transmission ratio.

2. The automatic transmission set forth in claim 1 wherein the one gearset is downshifted and the other gearset is upshifted as the overall transmission ratio is upshifted.

3. The automatic transmission set forth in claim 1 wherein the one gearset is upshifted and the other gearset is downshifted as the overall transmission ratio is downshifted.

4. The automatic transmission set forth in claim 1 wherein the controllers are speed-based, the transmission comprising a torque input element for the first gearset and a first speed sensor for monitoring the speed of the torque input element;

an intermediate shaft connecting a torque output element of the one gearset to a torque input element of the other gearset; and a second speed sensor for monitoring the speed of the intermediate shaft;

the transmission further comprising an output shaft drivably connected to the vehicle traction wheels and a third speed sensor for monitoring the speed of the output shaft;

the controllers responding to speed information from the speed sensors to implement synchronization of an upshift and a downshift of the one gearset and the other gearset during a swap-shift in an overall transmission ratio.

5. The automatic transmission set forth in claim 1 wherein the simultaneous upshifting and downshifting of each gearset during a swap-shift occurs as the controllers control pressure at each friction element in a closed-loop fashion during progression of the swap-shift when engine power is being delivered to the traction wheels.

6. The automatic transmission set forth in claim 5 wherein the one gearset is downshifted and the other gearset is upshifted as the overall transmission ratio is upshifted.

7. The automatic transmission set forth in claim 5 wherein the one gearset is upshifted and the other gearset is downshifted as the overall transmission ratio is downshifted.

8. A method for generating a control command in a control command generator for a speed-based control system of a multiple-ratio automatic transmission in a powertrain for an automotive vehicle, the automatic transmission including two gearsets controlled by pressure actuated friction elements to establish multiple torque flow paths between an engine and vehicle traction wheels, the method comprising the steps of:

measuring the input speed of one gearset and the input and output speeds of the other gearset;

computing shift progression and shift progression rate of the other gearset continuously during a gear ratio shift of the other gearset;

each gearset having separate shift controllers;

computing a shift progression rate of the other gearset continuously during a gear ratio shift of the other gearset;

transferring shift progression and shift progression rate information to the control command generator;

computing a desired shift progression of the one gearset as a function of shift progression of the other gearset and the rate of shift progression of the other gearset;

computing a desired input speed of the one gearset as a function of the shift progression of the one gearset and the input speed of the other gearset; and measuring an error between the computed desired input speed and an actual input speed of the one gearset whereby pressure applied to the friction element of the one gearset is controlled to achieve synchronized timing of a ratio change in the one gearset relative to a ratio change in the other gearset.

9. The method set forth in claim 8 wherein the computation of desired shift progression for the one gearset and the computation of a shift progression for the other gearset are made during an overall shift progression whereby the control of pressure on the friction element of the one gearset is subordinated at each selected target point to the control of pressure on the friction element of the other gearset.

10. The method set forth in claim 9 wherein the control of friction element pressure using pressure commands is a closed-loop control, control of pressure commands for the one gearset ending before the end of closed-loop control of pressure commands for the other gearset and the control of pressure commands for the one gearset beginning after the start of closed-loop control of pressure commands for the other gearset.

11. The method set forth in claim 9 wherein the desired input speed for the one gearset is computed as a function of a desired shift progression for the one gearset, output speed of the one gearset, the starting ratio for the one gearset and the final ratio of the one gearset.

12. The method set forth in claim 10 wherein the desired input speed for the one gearset is computed as a function of a desired shift progression for the one gearset, output speed of the one gearset, the starting ratio for the one gearset and the final ratio of the one gearset.

13. The method set forth in claim 9 wherein the shift progression and shift progression rate for the other gearset are computed using input and output speeds of the other gearset, starting ratio and final ratio of the other gearset and the derivative of the shift progression of the other gearset.

14. The method set forth in claim 10 wherein desired input speed for the one gearset is computed as a function of a desired shift progression for the one gearset, output speed of the one gearset, starting ratio for the one gearset and the final ratio of the one gearset.

15. The method set forth in claim 11 wherein shift progression and shift progression rate for the other gearset are computed using the input and output speeds of the other gearset, starting and final ratios of the other gearset and the derivative of the shift progression of the other gearset.

16. The method set forth in claim 12 wherein shift progression and shift progression rate for the other gearset are computed using the input and output speeds of the other gearset, starting and final ratios of the other gearset and the derivative of the shift progression of the other gearset.

* * * * *